United States Patent
Levy et al.

(10) Patent No.: US 8,621,491 B2
(45) Date of Patent: Dec. 31, 2013

(54) PHYSICAL OBJECT VISUALIZATION FRAMEWORK FOR COMPUTING DEVICE WITH INTERACTIVE DISPLAY

(75) Inventors: Robert Levy, Seattle, WA (US); Sundaram Ramani, Redmond, WA (US); Bryan Beatty, Sammamish, WA (US); Scot D. Anderson, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1428 days.

(21) Appl. No.: 12/109,348

(22) Filed: Apr. 25, 2008

(65) Prior Publication Data
US 2009/0271727 A1    Oct. 29, 2009

(51) Int. Cl.
G06F 3/00 (2006.01)
G06F 9/44 (2006.01)
G06F 9/46 (2006.01)

(52) U.S. Cl.
USPC .......................................... 719/328; 719/318

(58) Field of Classification Search
None
See application file for complete search history.

(56) References Cited

U.S. PATENT DOCUMENTS

| | | | |
|---|---|---|---|
| 5,729,249 A * | 3/1998 | Yasutake | 345/173 |
| 7,103,499 B2 | 9/2006 | Goodwin et al. | |
| 7,139,685 B2 | 11/2006 | Bascle et al. | |
| 7,181,363 B2 | 2/2007 | Ratti et al. | |
| 7,445,551 B1 * | 11/2008 | Okada et al. | 463/43 |
| 7,812,826 B2 * | 10/2010 | Ording et al. | 345/173 |
| 2003/0018541 A1 | 1/2003 | Nohr | |
| 2004/0207599 A1 | 10/2004 | Kurtenbach et al. | |
| 2005/0024341 A1 * | 2/2005 | Gillespie et al. | 345/173 |
| 2007/0192727 A1 | 8/2007 | Finley et al. | |

FOREIGN PATENT DOCUMENTS

WO    WO2007121557 A1    11/2007

OTHER PUBLICATIONS

Tuddenham, et al., "T3: Rapid Prototyping of High-Resolution and Mixed-Presence Tabletop Applications", Horizontal Interactive Human-Computer Systems, 2007, pp. 8.
Baraldi, et al., "Introducing TANGerINE: A Tangible Interactive Natural Environment", Proceedings of the 15th International Conference on Multimedia, ACM, 2004, pp. 4.
Andujar, et al., "A Cost-effective Approach for Developing Application-control GUIs for Virtual Environments", Proceedings of the 2006 IEEE Symposium on 3D User Interfaces (3DUI'06), IEEE Computer Society, IEEE, 2006, pp. 8.

* cited by examiner

*Primary Examiner* — H S Sough
*Assistant Examiner* — Craig Dorais
(74) *Attorney, Agent, or Firm* — Alleman Hall McCoy Russell & Tuttle LLP

(57) ABSTRACT

Devices and methods for displaying a visualization graphic on an interactive display are provided. One disclosed device may include an interactive display configured to detect a tag positioned proximate a display surface of the interactive display. The device may further include a processor configured to execute an application program and an application programming interface (API) configured to receive a tag monitoring request from the application program. The tag monitoring request may include application-specific tag visualization settings. The API may be configured to receive a tag tracking message from the interactive display, and in response, send a visualization command to the interactive display. The visualization command may be based upon the application-specific tag visualization settings and may be configured to cause the interactive display to display a visualization graphic proximate the tag.

18 Claims, 3 Drawing Sheets

PHYSICAL OBJECT VISUALIZATION FRAMEWORK FOR COMPUTING DEVICE WITH INTERACTIVE DISPLAY

BACKGROUND

Computing devices with interactive displays are capable of identifying objects that are placed on the display and performing certain associated actions. For example, a phone may be placed on the display and marketing information about the phone may be shown on the display. In another example, an MP3 player on the display is recognized and a user is permitted to drag songs shown on the display to and from the MP3 player. In yet another example, a camera in the vicinity of the display is identified and the display downloads photos from the camera onto the display. Performing the desired associated actions first involves recognizing the object, monitoring its whereabouts and movement, and generating and displaying a visualization representing the recognized object on the display. These are complicated functions that may be time- and labor-intensive to program, which may drive up the costs to develop software.

SUMMARY

Devices and methods for displaying a visualization graphic on an interactive display are provided. One disclosed device may include an interactive display configured to detect a tag positioned proximate a display surface of the interactive display. The device may further include a processor configured to execute an application program and an application programming interface (API) configured to receive a tag monitoring request from the application program. The tag monitoring request may include application-specific tag visualization settings. The API may be configured to receive a tag tracking message from the interactive display, and in response, send a visualization command to the interactive display. The visualization command may be based upon the application-specific tag visualization settings and may be configured to cause the interactive display to display a visualization graphic proximate the tag.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
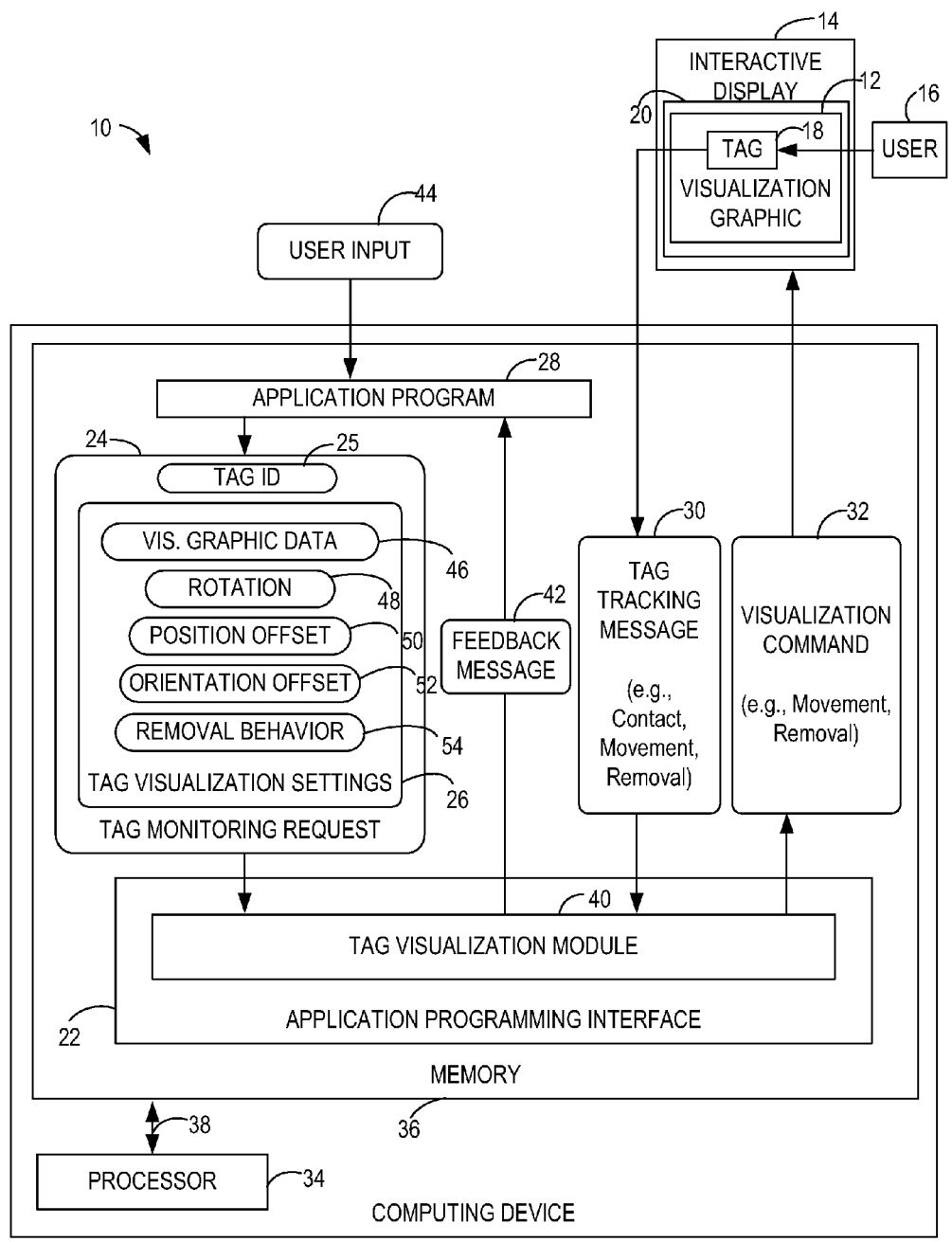
FIG. 1 is a schematic diagram illustrating an interactive computing device for displaying a visualization graphic associated with a physical object on an interactive display.

According to one or more embodiments, a physical object visualization framework is provided in an application programming interface (API) to allow application programs to specify physical object visualization behavior. As shown in FIG. 1, a schematic diagram illustrates an interactive computing device 10 for displaying visualization graphic 12 associated with a physical object positioned proximate an interactive display 14. In one embodiment, a user 16 may place the physical object marked with a tag 18 proximate a display surface 20 of the interactive display 14. The interactive computing device 10 may include an API 22 configured to receive a tag monitoring request 24, including application-specific tag visualization settings 26, from an application program 28. The API 22 may be further configured to receive a tag tracking message 30 from the interactive display 14, and in response, send a visualization command 32 to the interactive display 14. The visualization command 32 may be configured to cause the interactive display 14 to display a visualization graphic 12 proximate the tag 18.

It will be appreciated that the physical object may include virtually any item that the user chooses to place proximate to the display surface of the interactive display (e.g., mobile phone, card, camera, car key chain). To be recognized by the interactive display, the physical object may include a tag, which may be any recognizable way of identifying a physical object for the interactive display. Tags may include optical tags, radio frequency identification (RFID) tags, a pattern of dots, or other indicia that may be recognized by the interactive display. For example, a tag may be a metallic sticker adhering to the back of a cellular phone. In another example, a unique raised pattern of dots on the back of a personal digital assistant (PDA) may be sufficiently recognizable by the interactive display to be a tag.

The interactive computing device 10 may further include a processor 34 configured to execute the application program 28 and the API 22 from memory 36 via a bus 38. The API may include a tag visualization module 40 configured to receive tag tracking messages 30 from the interactive display 14, receive tag monitoring requests 24 from the application program 28, send visualization commands to the interactive display, and send feedback messages 42 to the application program 28. The API 22 may be further configured with other modules that work with the tag visualization module 40. For example, the API 22 may include a module that tracks all of the tags.

The application program 28 may be configured to accept user input 44 which may be entered via any suitable user input mechanism (e.g., keyboard, mouse, interactive display surface). For example, user input 44 may include selection of a visualization graphic that may be associated with a particular tag. In an alternate embodiment, the application program 28 may communicate with the interactive display 14 as well.

The application program 28 may be configured to receive a feedback message 42 from API 22. The feedback message 42 may include status information on the monitored tags recognized by the interactive display 14, such as the number, identity, position, orientation, and user-selection of these monitored tags. This information may be received and processed by the application program in a programmatic manner to facilitate user interaction with the application program via the visualization graphics 12.

The interactive display 14 may be configured to detect a tag 18 positioned proximate a display surface 20 of the interactive display 14. Depending on the type of tag, the tag 18 may need to be within an effective distance from the display surface 20 in order for the tag 18 to be recognized. For example, an optical tag which may need direct light transmission to the display surface may not be recognized two inches away while an RFID tag may be recognized.

The interactive display 14 may be formed integrally in a housing of the interactive computing device 10. Alternatively, the interactive display 14 may be a formed in a separate housing, and configured to communicate over a wired or wireless connection with the interactive computing device 10.

The interactive display 14 may send tag tracking messages 30 to communicate a detected position of a tag to the API 22. Tag tracking messages 30 may include contact messages, movement messages, removal messages, and other tag tracking messages that the interactive display 14 may need to relay to the API 22. A tag tracking message 30 to indicate tag contact may be sent to the API 22 to indicate that a tag 18 has been detected proximate the display surface 20 of the interactive display 14. A tag tracking message 30 to indicate tag movement may also be sent to the API 22 to indicate that a tag 18 has moved to a different location on the interactive display 14. A tag tracking message 30 to indicate tag removal may further be sent to the API 22 to indicate that a tag 18 has been removed from the interactive display 14. In an alternate embodiment, only tag tracking messages 30 are sent to the API 22 to indicate instances of tag detection by the interactive display 14, and the API 22 is configured to determine whether a tag is newly detected, whether the tag has moved, or whether the tag has been removed.

In one embodiment, the interactive display 14 may be configured to detect multiple tags concurrently. The multiple tags may be identical tags which represent the same physical objects or different tags which represent different physical objects. It will be appreciated that multiple tags may also be used to represent one physical object. The API 22 may also be configured to receive tag tracking messages and send visualization commands concurrently. The visualization graphic corresponding to the most recently added tag is displayed on top of the other visualization graphics.

The API 22 may be configured to receive a tag monitoring request 24 from the application program 28. The tag monitoring request 24 may include a request to monitor one or more tags, which may be identified, for example, by tag data such as a tag identifier 25. The tag monitoring request 24 may further include application-specific tag visualization settings 26, which inform the API 22 how to display the visualization graphic 12 on the interactive display 14 for one or more tags that the application program 28 has requested the API 22 to monitor.

Application-specific tag visualization settings 26 may include visualization graphic data 46, as well as a rotation setting 48, position offset setting 50, orientation offset setting 52, and removal behavior setting 54. Additional tag visualization settings may be sent from the application program for customization of the display of a visualization graphic. For example, a software developer may want to specify by a tag visualization setting a period of time for displaying a visualization graphic, etc.

Figure 2:
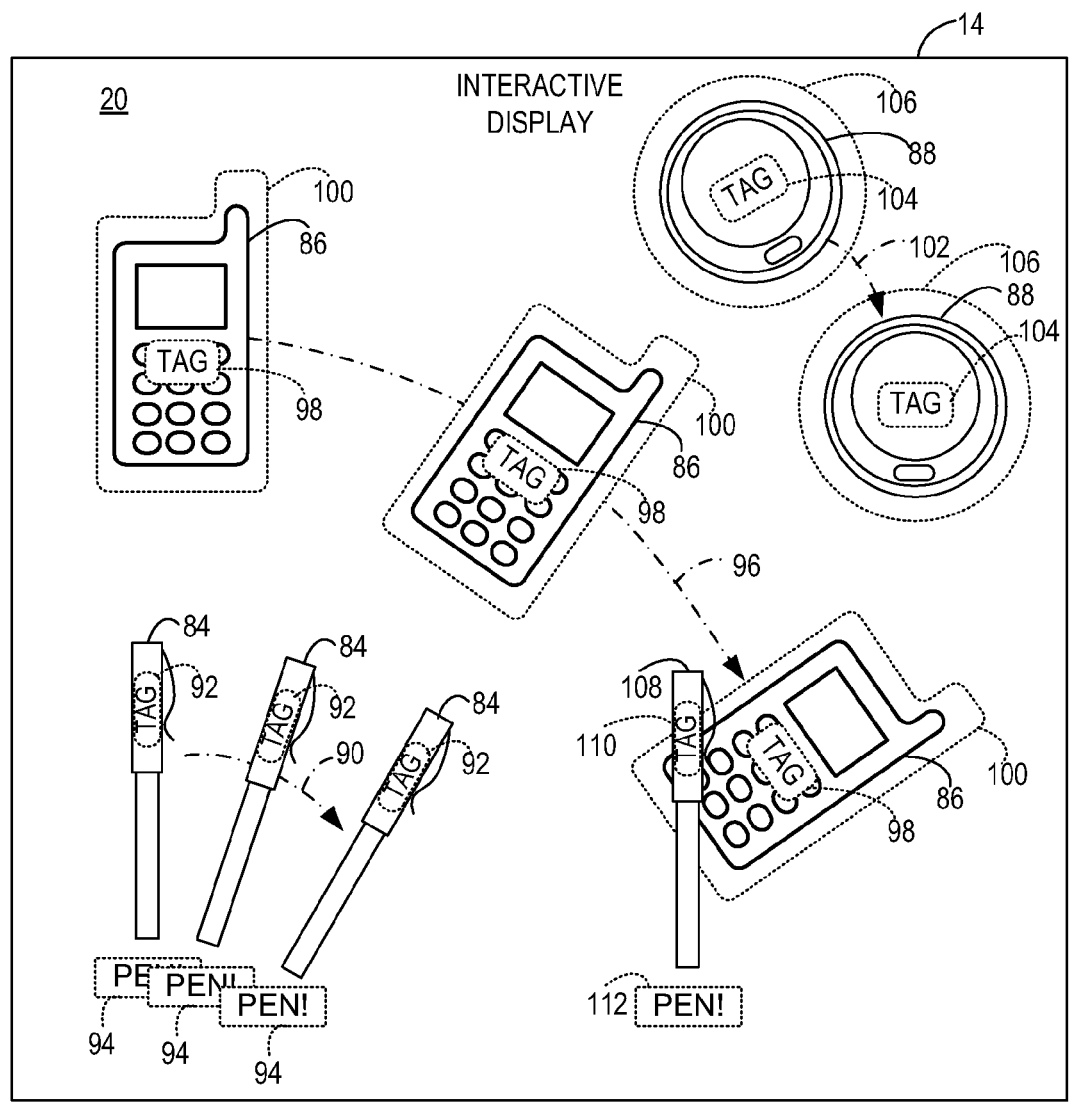
FIG. 2 is a top view of the interactive display of FIG. 1, including physical objects and associated visualization graphics.

Visualization graphic data 46 may be used by the API 22 to generate a visualization graphic 12 to display on the interactive display 14. A visualization graphic 12 includes any suitable graphical representation of a tag 18 that may be displayed on the interactive display 14. The visualization graphic enables the user to recognize that the object with the tag is detected by the interactive display 14, and may provide a visual cue to the user during interaction between the application program and the object. As one example, if a user places a car key chain on the interactive display, the interactive display may display a car-shaped graphic as the visualization graphic. It will be appreciated that in some embodiments a plurality of visualization graphics 12 may be included in visualization graphic data 46, and the interactive display 14 may be configured to present a graphical user interface configured to receive a user selection of a desired visualization graphic for display with a tag. Thus, a user may be given the option of a car-shaped graphic, as discussed above, or a key-shaped graphic, for example, to be displayed as the visualization graphic proximate the tag. Other example visualization graphics are depicted in FIG. 2, described below.

Rotation setting 48 may indicate whether the visualization graphic 12 will rotate with a detected rotation of the tag 18 on the interactive display 14. For example, a watch with a tag 18 may be placed and rotated on the display surface 20, and a virtual clock may be displayed as a visualization graphic 12. In this instance, the rotation setting 48 may convey to the API 22 that the visualization graphic 12 (i.e., the time) should not be rotated, so that irrespective of the orientation of the watch, the virtual clock will be displayed in a fixed orientation that is readable by a user.

Position offset setting 50 may be used to specify the relationship between where the tag 18 is positioned with respect to the visualization graphic 12. Orientation offset setting 52 may be used to specify the relationship between how the tag 18 is oriented with respect to the visualization graphic 12. In one embodiment, the position offset setting and orientation offset setting may be entered into a module in the API 22 to automatically keep a visualization graphic 12 positioned correctly in relation to the tag 18 no matter where the tag 18 is placed or how it is rotated.

The removal behavior setting 54 controls how the visualization graphic 12 behaves when the tag 18 is removed. Removal behavior setting 54 may include disappear, fade, wait, and persist settings. When the removal behavior setting 54 is set to disappear, upon detection of removal of the tag 18, the visualization graphic 12 may be removed from the interactive display 14. In some embodiments, disappear may be set as a default removal behavior setting.

Removal behavior setting 54 may include a wait setting, which allows the visualization graphic 12 to remain in place until the tag 18 returns. When the tag 18 returns, whether at the same position or at a different position, visualization graphic 12 may jump to be under the tag 18. If multiple tags representing the same physical object are placed down and removed and then one is placed back down, the visualization graphic associated with the removed tag that is closest to the most recently placed tag may be used. The wait setting may be used, for example, in embodiments in which the visualization graphic is removed programmatically by the application program during the wait cycle. For example, the application program may remove all visualization graphics in a wait state for a predetermined of time, such as one minute.

Removal behavior setting 54 may include a fade setting, according to which the visualization graphic 12 may fade away, i.e., lose opacity, over a period of time (e.g., 1-3 seconds), and may be removed when the fade completes. If a tag 18 associated with the visualization graphic 12 is detected to return to the display before the fade completes, the API 22 may be configured to cause the visualization graphic 12 to jump to be under the tag 18 with full opacity. If multiple tags representing the same physical object are placed down and removed and then one is placed back down, the API 22 may be configured to cause the visualization graphic 12 closest to and associated with the most recently placed tag to be used, not counting visualization graphics that have completely faded away and been removed.

Removal behavior setting 54 may include a persist setting, according to which the visualization graphic remains in place for an unlimited time (e.g., a stamp). This may be useful, for example, to enable the application program to programmatically request that visualization graphics that are in a persist state may be removed, under certain predetermined conditions, such as when a user exits the application program. While example removal behaviors are described herein, it will be appreciated that other specific removal behaviors may be customized and entered by a software developer.

The API 22 may be further configured to receive a tag tracking message 30 from the interactive display 14, indicating that contact of the tag has been detected by the interactive display. In response, the API 22 may be configured to send a visualization command 32 to the interactive display 14. The visualization command 32 may be based upon the application-specific tag visualization settings 26 received from the application program 28. The visualization command may also include additional non-application specific instructions to the interactive display on how to display the visualization graphic 12. By sending this visualization command 30, the API 22 is configured to cause the interactive display 14 to display a visualization graphic 12 proximate the tag 18.

The API 22 may be further configured to receive a tag tracking message 30 in the case of tag movement, indicating that the interactive display 14 has detected an updated position of the tag 18. The API 22 is configured to send a movement visualization command 32 based upon the application-specific tag visualization settings 26 to instruct the interactive display 14 to display the visualization graphic 12 proximate the updated detected position. It will be appreciated that the API 22 may be configured to make a determination about whether a tag is lost or whether a tag is treated as movement due to a detection process for the tag timing out.

Tag timing out can be employed to compensate when performance abilities of hardware and software of the interactive display 14 for tag detection are exceeded. For example, the interactive display 14 may have difficulty tracking tag motion if the tag is moving too fast, or is positioned too far from the surface of the interactive display, resulting in tag detection being lost. When this happens, for example if a user moves the tagged object very quickly, or picks up the tagged object and then sets it down elsewhere, the interactive display's input system may register this as a "tag removed" event (when it loses the tag) followed by a "tag added" event later (when it regains the tag). The tag visualization module 40 can be configured with a predetermined timeout period. If the visualization module receives a first tag tracking message indicating that a tag is lost, followed by a second tag tracking message indicating that a new tag contact is detected within the predetermined period of time, the tag visualization module may be configured to treat the combination of first and second tag tracking messages as a tag tracking message indicating that a tag has moved to an updated position, instead of a new tag being added.

The API 22 may be further configured to receive a tag tracking message 30 indicating that the tag 18 has been removed. As a response, the API 22 may be further configured to send a removal visualization command 32 to the interactive display 14 instructing the interactive display 14 to treat the visualization graphic 12 according to the removal behavior setting, as described above.

FIG. 2 is a top view of the interactive display of FIG. 1, including physical objects and associated visualization graphics, created in accordance with one or more embodiments as described above. Interactive display 14 includes a display surface 20 with a pen 84, a cellular or mobile phone 86, and a coffee cup 88 (with lid) positioned proximate to the display surface. This figure schematically illustrates movement of these physical objects, their associated tags, and associated visualization graphics.

In a first example of movement on the interactive display 14, the pen 84 is depicted moving along a path 90 across the display surface 20. Pen 84 may include a tag 92 and corresponding visualization graphic 94. Application program 28 has provided application-specific tag visualization settings 26 to API 28 to generate the visualization graphic 94. In this example, the visualization graphic 94 is a simple text box "PEN!". Rotation setting 48 has been set such that no rotation of the visualization graphic 94 relative to the tag 92 occurs. This enables a user to easily read the text in the visualization graphic. A position offset setting 50 and an orientation offset setting 52 have been set such that the visualization graphic 94 is located at a distance away from the tag 92.

In a second example of movement on the interactive display 14, the phone 86 is depicted moving along a path 96 across the display surface 20. Phone 86 may include a tag 98 and corresponding visualization graphic 100. Application program 28 has provided application-specific tag visualization settings 26 to API 28 to generate the visualization graphic 100. In this example, the visualization graphic 100 is in a shape of a phone sized slightly larger than the phone 86. Rotation setting 48 has been set such that rotation of the visualization graphic 100 occurs with rotation of the tag 98. Position offset setting 50 and orientation offset setting 52 have been set such that the visualization graphic is positioned and centered with the tag 98 and the physical object 86.

In a third example of movement on the interactive display 14, the coffee cup 88 is depicted moving along a path 102. Coffee cup 88 may include a tag 104 and a corresponding visualization graphic 106. Application program 28 has provided application-specific tag visualization settings 26 to API 28 to generate the visualization graphic 106. In this example, the visualization graphic 106 is in a shape of the coffee cup 88 and sized slightly larger. Rotation setting 48 is set such that rotation of the visualization graphic 106 does not occur with rotation of the tag 104. However, in this example, the appearance of the visualization graphic is not affected because the coffee cup is circular and the tag is centered. A position offset setting 50 and an orientation offset setting 52 have been selected such that the visualization graphic 106 is positioned and centered with the tag 104 and the physical object 88.

Although FIG. 2 is depicted in two-dimensions, it will be appreciated that in some embodiments the interactive display may recognize tags that are a certain distance from the display surface, such as when RFID tags are utilized. For example, a user may place the pen 108 on top of the phone 86. Since the pen 108 has a tag 110 within a detectable distance from the display surface 82, the tag 110 may be recognized by the interactive display 14 and in response, a visualization graphic 112 associated with the pen 108 is displayed as shown. It will also be appreciated that tags specified by an application program via the tag monitoring request can be detected even if physically placed on top of a visualization graphic.

Figure 3:
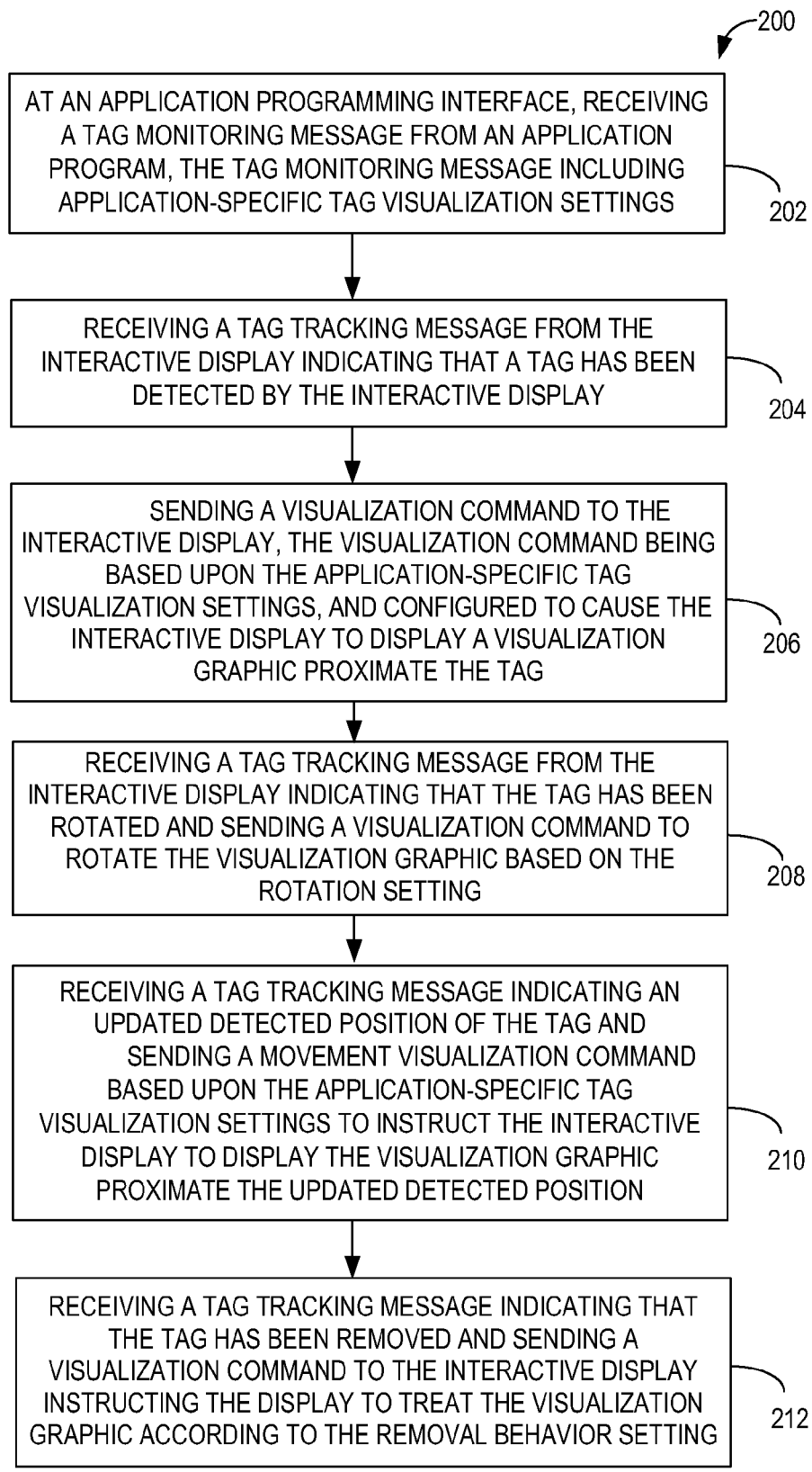
FIG. 3 is a flowchart of an embodiment of a method for displaying a visualization graphic on an interactive display.

Referring to FIG. 3, a flowchart of an embodiment of a method for displaying a visualization graphic on an interactive display is shown at 200. At 202, method 200 may include, at an application programming interface, receiving a tag monitoring request from an application program, the tag monitoring request including application-specific tag visualization settings. As discussed above, examples of application-specific tag visualization settings may include visualization graphic data, as well as a rotation setting, position offset setting, orientation offset setting, and removal behavior setting. At 204, method 200 may include receiving a tag tracking message from the interactive display indicating that a tag has been detected by the interactive display.

At 206, method 200 may include sending a visualization command to the interactive display, the visualization command being based upon the application-specific tag visualization settings received from the application program, and configured to cause the interactive display to display a visualization graphic proximate the tag.

At 208, method 200 may include receiving a tag tracking message from the interactive display indicating that the tag has been rotated and sending a visualization command to rotate the visualization graphic based on a rotation setting. As discussed above, the rotation setting may indicate whether the tag visualization will rotate with a detected rotation of the tag on the interactive display.

Method 200 may include, at 210, receiving a tag tracking message indicating an updated detected position of the tag and sending a movement visualization command based upon the application-specific tag visualization settings to instruct the interactive display to display the visualization graphic proximate the updated detected position. In some embodiments, the method may further include receiving a first tag tracking message indicating that a tag is lost, followed by a second tag tracking message indicating that a new tag contact is detected within a predetermined period of time, and in response, treating the first and second tag tracking messages as a tag tracking message indicating that a tag has moved to an updated position.

At 212, method 200 may include receiving a tag tracking message indicating that the tag has been removed and sending a visualization command to the interactive display instructing the display to treat the visualization graphic according to a removal behavior setting, which, as discussed above, may include disappear, fade, wait, and persist settings.

The above described devices and methods may be utilized to efficiently display visualization graphics as specified by an application program onto an interactive display, via an application programming interface. This may enable routines controlling the detection of contact, movement, and removal of a tag, and the corresponding commands for display, movement, and removal of visualization graphics, to reside in the application programming interface, while still operating according to application specific settings received from an application program, thereby saving development costs while providing implementation flexibility.

It will be appreciated that the computing devices described herein may include a processor and associated volatile and non-volatile memory, and may be configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An interactive computing device, comprising:
an interactive display configured to detect a position and a rotation of an optical tag positioned proximate a display surface of the interactive display; and
a processor configured to execute an application program and an application programming interface;
wherein the application programming interface is configured to receive a tag monitoring request from the application program, the tag monitoring request including application-specific tag visualization settings;
wherein the application programming interface is configured to receive a first tag tracking message from the interactive display, and in response send a visualization command to the interactive display, the visualization command being based upon the application-specific tag visualization settings received from the application program to provide a customization of a display of a visualization graphic based on the detected position and rotation of the optical tag, and configured to cause the interactive display to display the visualization graphic proximate the optical tag; and
wherein the application programming interface is further configured to receive a second tag tracking message indicating that the optical tag is lost, followed by a third tag tracking message indicating that a new optical tag contact is detected within a predetermined period of time, and, in response, to treat the second and third tag tracking messages as a fourth tag tracking message indicating that the optical tag has moved to an updated position.

2. The interactive computing device of claim 1, wherein the application-specific tag visualization settings include visualization graphic data for the visualization graphic displayed on the interactive display.

3. The interactive computing device of claim 1, wherein the application-specific tag visualization settings include a rotation setting indicating whether the visualization graphic will rotate with the detected rotation of the optical tag on the interactive display.

4. The interactive computing device of claim 1, wherein the application-specific tag visualization settings include one or more of a position offset setting and an orientation offset setting.

5. The interactive computing device of claim 1, wherein the application programming interface is further configured to receive the fourth tag tracking message indicating the updated position of the optical tag, and wherein the application programming interface is configured to send a movement visualization command based upon the application-specific tag visualization settings to instruct the interactive display to display the visualization graphic proximate the updated position.

6. The interactive computing device of claim 1,
wherein the application-specific tag visualization settings include a removal behavior setting.

7. The interactive computing device of claim 6,
wherein the application programming interface is configured to receive a fifth tag tracking message that indicates that the optical tag has been removed; and
wherein the application programming interface is further configured to send a removal visualization command to the interactive display instructing the interactive display to treat the visualization graphic according to the removal behavior setting, in response to the fifth tag tracking message.

8. The interactive computing device of claim 7, wherein the removal behavior setting is selected from the group consisting of disappear, fade, wait, and persist.

9. The interactive computing device of claim 1, wherein the interactive display is configured to detect multiple optical tags concurrently.

10. A method of displaying a visualization graphic on an interactive display, comprising:
 at an application programming interface, receiving a tag monitoring request from an application program, the tag monitoring request including application-specific tag visualization settings;
 receiving a first tag tracking message from the interactive display indicating a position and a rotation of an optical tag that has been detected by the interactive display; and
 sending a visualization command to the interactive display, the visualization command being based upon the application-specific tag visualization settings received from the application program to provide a customization of a display of a visualization graphic based on the detected position and rotation of the optical tag, and configured to cause the interactive display to display the visualization graphic proximate the optical tag;
 wherein the application programming interface is further configured to receive a second tag tracking message indicating that the optical tag is lost, followed by a third tag tracking message indicating that a new optical tag contact is detected within a predetermined period of time, and, in response, to treat the second and third tag tracking messages as a fourth tag tracking message indicating that the optical tag has moved to an updated position.

11. The method of claim 10, wherein the application-specific tag visualization settings include visualization graphic data for the visualization graphic displayed on the interactive display.

12. The method of claim 10, wherein the application-specific tag visualization settings include a rotation setting indicating whether the visualization graphic will rotate with the detected rotation of the optical tag on the interactive display; and
 wherein the fourth tag tracking message further indicates that the optical tag has been rotated; and
 wherein the visualization command is additionally configured to cause the interactive display to rotate the visualization graphic based on the rotation setting.

13. The method of claim 10, wherein the application-specific tag visualization settings include a position offset setting and/or an orientation offset setting.

14. The method of claim 10, further comprising:
 receiving the fourth tag tracking message indicating the updated position of the optical tag; and
 sending a movement visualization command based upon the application-specific tag visualization settings to instruct the interactive display to display the visualization graphic proximate the updated position.

15. The method of claim 10, wherein the application-specific tag visualization settings include a removal behavior setting.

16. The method of claim 15, further comprising:
 receiving a fifth tag tracking message indicating that the optical tag has been removed; and
 sending a visualization command to the interactive display instructing the display to treat the visualization graphic according to the removal behavior setting.

17. The method of claim 16, wherein the removal behavior setting is selected from the group consisting of wait, disappear, fade, and persist settings.

18. Computer readable storage media hardware device having instructions stored thereon that when executed by a processor of a computing device cause the computing device to perform the following steps:
 at an application programming interface, receiving a tag monitoring request from an application program, the tag monitoring request including application-specific tag visualization settings;
 receiving a first tag tracking message from the interactive display indicating a position and a rotation of an optical tag that has been detected by the interactive display;
 sending a visualization command to the interactive display, the visualization command being based upon the application-specific tag visualization settings received from the application program to provide a customization of a display of a visualization graphic based on the detected position and rotation, and configured to cause the interactive display to display the visualization graphic proximate the optical tag;
 receiving a second tag tracking message indicating that the optical tag is lost, followed by a third tag tracking message indicating that a new optical tag contact is detected within a predetermined period of time, and, in response, treating the second and third tag tracking messages as a fourth tag tracking message indicating that the optical tag has moved to an updated position; and
 sending a movement visualization command based upon the application-specific tag visualization settings to instruct the interactive display to display the visualization graphic proximate the updated position.

* * * * *